US007451790B2

(12) United States Patent
Vallebrant et al.

(10) Patent No.: US 7,451,790 B2
(45) Date of Patent: Nov. 18, 2008

(54) DEVICE FOR CONTROLLING HYDRAULIC POWER UNITS

(75) Inventors: Per-Ola Vallebrant, Trollhättan (SE); Mikael Sannelius, Älvsjö (SE)

(73) Assignee: Parker-Hannifin Corporation, Cleveland, OH (US)

(*) Notice: Subject to any disclaimer, the term of this patent is extended or adjusted under 35 U.S.C. 154(b) by 61 days.

(21) Appl. No.: 10/549,736

(22) PCT Filed: Mar. 19, 2004

(86) PCT No.: PCT/SE2004/000408

§ 371 (c)(1),
(2), (4) Date: Sep. 19, 2005

(87) PCT Pub. No.: WO2004/083653

PCT Pub. Date: Sep. 30, 2004

(65) Prior Publication Data

US 2006/0201004 A1 Sep. 14, 2006

(30) Foreign Application Priority Data

Mar. 21, 2003 (SE) .................................... 0300762

(51) Int. Cl.
*A01G 23/08* (2006.01)
*F15B 11/00* (2006.01)

(52) U.S. Cl. ......................... 144/4.1; 144/34.1; 91/418; 91/446

(58) Field of Classification Search ................. 144/356, 144/382, 4.1, 34.1; 91/418, 429, 445, 446, 91/469
See application file for complete search history.

(56) References Cited

U.S. PATENT DOCUMENTS

| | | | | |
|---|---|---|---|---|
| 2,795,933 | A * | 6/1957 | McCallum | 173/8 |
| 2,878,015 | A | 3/1959 | Panissidi | |
| 4,722,258 | A * | 2/1988 | Johnson | 83/72 |
| 5,293,914 | A * | 3/1994 | Hudson | 144/24.13 |
| 6,041,683 | A * | 3/2000 | Timperi et al. | 83/76 |
| 6,986,368 | B2 * | 1/2006 | Brown | 144/4.1 |
| 7,017,460 | B2 | 3/2006 | Virvalo et al. | |
| 2006/0249015 | A1 * | 11/2006 | Vallebrant | 91/418 |
| 2007/0034077 | A1 * | 2/2007 | Vallebrant et al. | 91/482 |

* cited by examiner

*Primary Examiner*—Shelley Self
(74) *Attorney, Agent, or Firm*—Daniel J. Whitman

(57) ABSTRACT

An arrangement for controlling two drive units which interact with one another, one of which includes a hydraulically driven motor (2). The motor drives a varying load, and one or more valves (6, 7) control hydraulic fluid flow through the motor during operation and for starting and stopping of the motor. One of the valves is a flow control valve (7) for flow control of the hydraulic fluid flow through the motor. The second drive unit (37) performs a working movement which, under the action of hydraulic flow influences the loading of the motor. The flow of the hydraulic fluid to the second drive unit is controlled in a coordinated way with the control of the flow through the motor.

11 Claims, 2 Drawing Sheets

DEVICE FOR CONTROLLING HYDRAULIC POWER UNITS

TECHNICAL FIELD

The present invention relates to an arrangement for controlling two hydraulic drive units which interact with one another.

BACKGROUND OF THE INVENTION

Certain applications of hydraulic systems involve the control of two drive units which, with separate movements, drive a working unit. This may include a hydraulic motor which works under load which varies greatly over time, which has hitherto involved certain problems. A major problem is the risk of interference between the functions of the two drive units. The inertia in a conventional hydraulic system can also mean that the hydraulic fluid flow is not sufficient for supplying the motor. Another critical situation with a risk of cavitation damage is when the motor is actuated into stop position.

A computer-controlled system for controlling the feed of a sawing unit on the basis of a number of control parameters is known from WO 01/84910.

BRIEF SUMMARY OF THE INVENTION

The object of the present invention is to produce an arrangement in which interference problems in the control of two separate but coordinated working movements of two hydraulic drive units are eliminated.

Said object is achieved by means of an arrangement according to the present invention.

DESCRIPTION OF FIGURES

The invention will be explained in greater detail below by means of some illustrative embodiments with reference to accompanying drawings, in which.

DETAILED DESCRIPTION OF THE INVENTION

Figure 1:
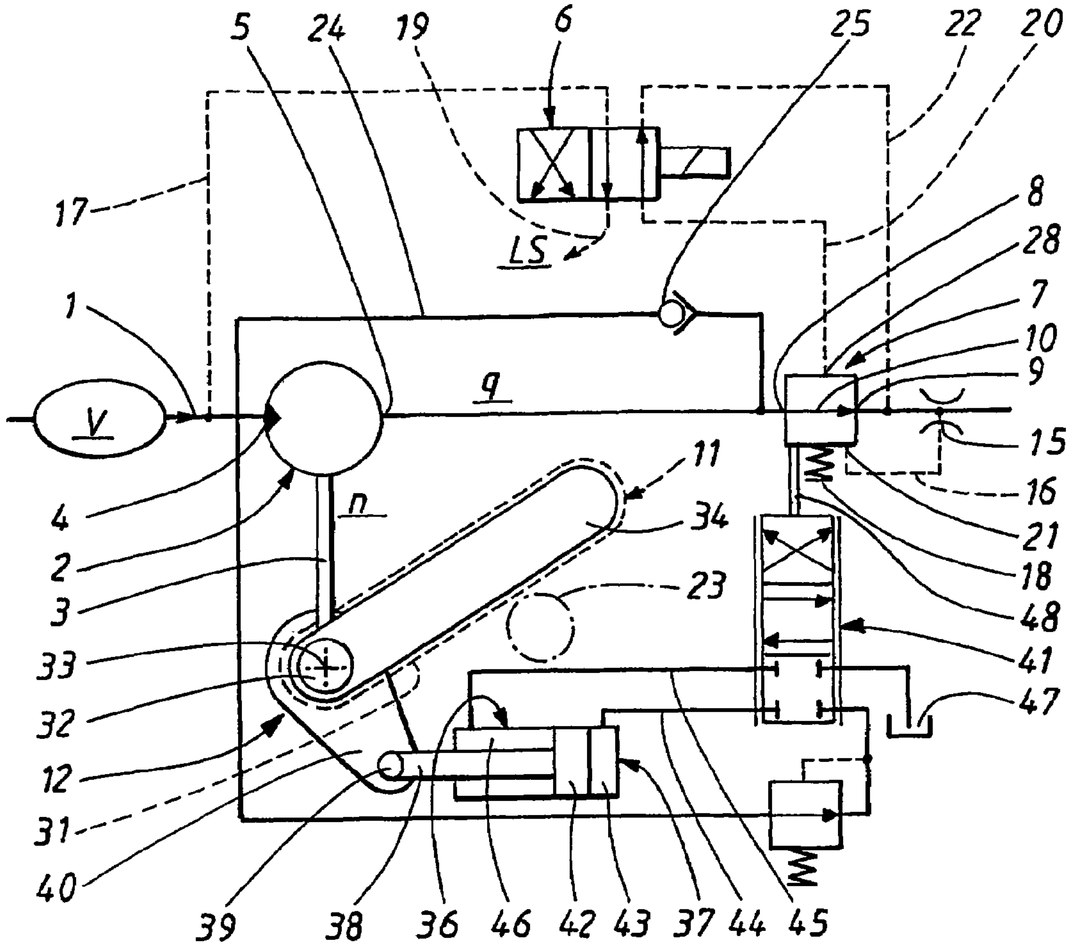
FIG. 1 shows a hydraulic system which includes the arrangement according to the invention in a first embodiment in acceleration position.

A hydraulic system in which the arrangement according to the invention can be applied is accordingly shown in the example according to FIG. 1. The system includes a hydraulic fluid duct 1 for a main flow from a hydraulic fluid pump (not shown). Also present is a hydraulic fluid volume v, in which a hydraulic fluid pressure is maintained. Hydraulic fluid under pressure is the driving medium adapted to drive a first drive unit in the form of a hydraulic motor 2, included in the system, with an output rotation shaft 3, which is adapted to drive some form of working unit which is to perform a certain task, for example a saw 11, such as a chain saw, in a harvester unit 12 for lumbering, to be precise sawing lumber. In this connection, the sawing unit and the hydraulic motor with its output rotation shaft are subjected to great instantaneous variations in load, entailing a risk of great instantaneous speed variations. Examples of types of hydraulic motor used for such applications are hydraulic axial piston machines of the bent axis type (see, for example, U.S. Pat. No. 6,336,391) or alternatively the inline type. Other types of hydraulic motor are also possible, for example a gear motor. The hydraulic motor has an inlet side 4, on which the hydraulic fluid is supplied under pressure, and an outlet side 5, from which the hydraulic fluid flows onward in the main duct 1 after pressure drop in the motor. The hydraulic system also includes a flow control valve 7 with an inlet 8 and an outlet 9 and a throughflow 10 in a valve slide, which can be adjusted between open and closed position under the action of an electrohydraulic actuator valve 6, which is adjustable between off position and on position, that is to say stop position and start/operating position, by means of an actuating device (not shown), which is actuated by an operator/computer.

In the example shown, the flow control valve 7 according to the invention is connected downstream of the hydraulic motor 2 on its outlet side 5 and has, in addition to the start/stop function, a regulating function in the form of a constant flow function which is adapted so as, when the actuator valve 6 is in operating position and hydraulic flow passes through the flow control valve, to maintain an essentially constant hydraulic flow through the hydraulic motor 2, in principle irrespective of load variations of the motor. The flow control valve 7 is suitably of the two-way type, that is to say with the inlet 8 and the outlet 9, the throughflow 10 being adapted to vary its throughflow area depending on the prevailing flow. In the example, this is sensed by sensing pressure drop across a following change in area, for example a narrowing 15, in the main duct 1 via a control duct 16 and via a control duct 22, which is connected to the main line 1 upstream of the narrowing 15, in which way the flow through the motor is controlled by means of the flow control valve depending on the pressure difference across the narrowing. The pressure-sensing upstream of the narrowing is led via the actuator valve 6. However, the narrowing can alternatively be positioned in different locations in the system apart from downstream of the constant flow valve, as is shown in FIG. 1, alternatively upstream of the motor 2 or between the motor and the valve. Connected around the motor 2 is a shunt line 24, which includes a non-return valve 25, which is adapted for relieving pressure by being capable of opening in the event of pressure surges on the outlet side of the motor.

The functioning of that part of the hydraulic system described so far, that is to say for driving and controlling the motor 2, will now be described with reference to FIG. 1. The general operating requirement for the invention is that as constant an optimized speed as possible of the motor 2 and its output rotation shaft 3 is to be maintained during normal operation and that extreme, instantaneous changes in speed are to be counteracted to as great an extent as possible, in spite of instantaneous load fall-off. An example of such an application is therefore sawing through a log 23, where the risk of what is known as racing arises owing to accumulated energy in hoses etc., symbolized by v, when the log has been sawn through and the load falls off. This is achieved by the flow control valve 7 being dimensioned to work with a rapid response and by this valve being positioned downstream of the motor 2, that is to say on its outlet side 5. When the actuator valve 6 is in stop. position, the flow control valve 7 is controlled so as to be closed by the action of system pressure via a control duct 17, control pressure from a second control duct 20 and a valve spring 18. In the stop position, the pump pressure acts directly on one control side or control input 28 of the control valve 7 via the control duct 20, which results in the slide with the throughflow 10 moving into end position and shutting off the entire main flow. Any load-sensing via a sensing duct 19 senses low pressure at the same time. If the pump pressure should fall, the force holding the flow control valve closed decreases. On the other hand, the force for rotating the motor decreases at the same time.

When the actuator valve 6 is adjusted from stop position to start position, the flow control valve 7 is opened by the spring 18 and is kept open because the control area is now acted on by the pressure in the control duct 22, which, in the start position, is the same as in the control duct 16. During operation, the flow control valve 7 works as a constant flow valve, the aim being to keep the hydraulic fluid flow through the flow control valve, and thus through the motor 2, constant by virtue of the valve being fully open when the flow is too low, and seeking to throttle the flow, that is to say brake the motor, when the flow is too high. If load-sensing is present, system pressure is sensed, which provides maximum flow. On stopping, the motor is braked on the rear side by the actuator valve 6 being adjusted to stop position again, the flow control valve 7 then being adjusted to closed position.

In the case of both constant flow control and stopping, the hydraulic fluid pressure at the motor inlet 4 is guaranteed the whole time by the system according to the invention, in contrast to known solutions with a stop valve and possibly a constant flow valve upstream of the motor where there is a risk of the motor running faster than the flow is sufficient for and thus rotating like a cavitating pump.

The hydraulic system also includes a second hydraulic drive unit for driving the working unit, which will now be described initially with reference to FIG. 1. In this example, the working unit is shown in the form of the unit 12 mentioned above, which consists of a hydraulically driven chain saw 11 with a saw chain 31 in the form of an endless loop, which is driven round by means of a driving wheel 32, which is rotated about its axis of rotation 33 by means of the output rotation shaft 3 of the hydraulic motor 2. The saw chain is supported by a guide plate 34, which is pivotable about the driving axis 33 for performing a sawing movement for sawing through a log 23. In the example shown, the second drive unit 36 consists of a guide plate feed unit which is hydraulically driven and consists of a reciprocating hydraulic unit in the form of a piston cylinder 37 which is double-acting in the embodiment according to FIG. 1. Its reciprocating linear movement is converted into a pivoting movement, that is to say the guide plate feed movement about the axis 33, by virtue of the outer end of the piston rod 38 being coupled eccentrically to the guide plate 34 via a joint 39 and a link arm 40. A three-position hydraulic valve 41, which constitutes the actuator valve for the guide plate feed, is provided for control of the guide plate feed.

The sawing torque, that is to say the torque by which the output rotation shaft 3 of the hydraulic motor 2 is loaded, varies depending on how hard the saw guide plate 34 is fed, that is to say how great a force or torque the feed unit 36 applies to the saw guide plate. A well-controlled guide plate feed is therefore required in order to achieve a sawing process which is as optimized as possible, that is to say lumbering or sawing-through in the shortest possible time by virtue of a well-balanced combination of optimization of feed force and motor speed of the hydraulic motor 2. This has therefore been achieved by operating the flow control valve 7 and the guide plate feed function together. In the example shown, this is effected by the slide of the flow control valve also regulating the guide plate feed. In this way, the guide plate feed will be controlled by the motor speed. As long as the speed has not reached a desired magnitude, it is ensured that the feed is shut off. If the saw runs heavy, the speed is reduced, which thus also reduces the feed, the speed then increasing. If the saw runs light, that is to say the load on the rotation shaft 3 decreases, the motor speed increases, as a result of which the feed force increases, that is to say the feed movement of the guide plate increases. The motor speed and thus the running speed of the saw chain around the guide plate as well are therefore regulated by virtue of the guide plate feed or, to be precise, the feed force being increased or reduced.

Figure 2:
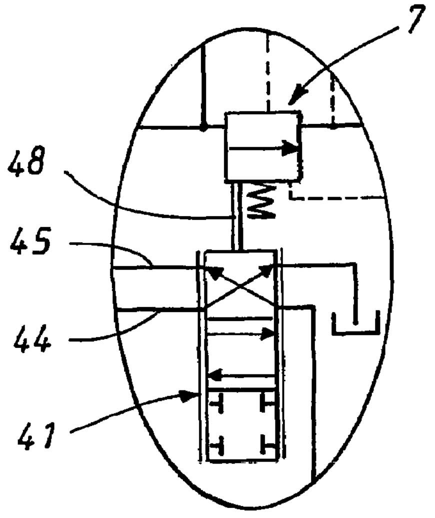
FIG. 2 is a detailed view of the system according to FIG. 1 in stop position.
Figure 3:
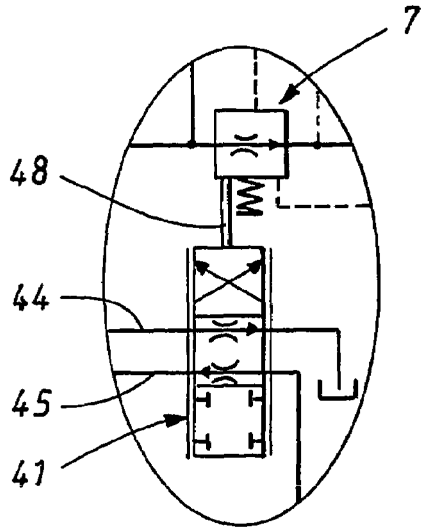
FIG. 3 is a detailed view of the system according to FIG. 2 in regulating position.

The actuator valve 41 for the guide plate feed therefore controls an inflow to the piston cylinder 37, to be precise to the cylinder chamber 43 on one side of the piston 42, via a first hydraulic fluid duct 44, an outflow via a second hydraulic fluid duct 45 from the cylinder chamber 46 on the opposite side of the piston conducting the flow via the actuator valve to a tank 47. The actuator valve 41 is shown in the shut-off position in FIG. 1. In this connection, the flow control valve 7 has been put into fully open position, that is to say start position, by activation of the actuator valve 6. This gives an acceleration position for the rotation of the saw by means of the motor 2, that is to say before the saw enters the log 23. In a second position, the stop position of the saw (see FIG. 2), the valve 41 has been changed over at the same time as the flow control valve 7 has been put into closed position, the opposite feed then taking place, that is to say inflow via the duct 45 and thus a return movement of the guide plate in the opposite pivoting direction, that is to say counterclockwise, when the saw is stopped and backward motion is to take place. In an intermediate position/regulating position, constant flow regulation in the example shown, feed takes place forward, that is to say inflow via the duct 44, the guide plate then being fed clockwise (see FIGS. 1 and 3). The hydraulic flow for the guide plate feed can be obtained via a reducing valve.

As both the guide plate feed function and the constant flow function regulate the speed of the hydraulic motor 2, it is important that the two functions are not allowed to interfere with one another. This risk is eliminated by the control being coordinated by the same valve slide or at least the same valve slide movement controlling both the functions depending on the actuation/regulation of the flow control valve 7 as shown by the embodiments according to FIGS. 1-6. In the embodiment according to FIGS. 1-3, the flow control valve 7 and the actuator valve 41 have separate valve bodies, for example slides, which are mechanically connected, rigidly connected in the example, for example by a rod 48, so that they perform the same movement.

Figure 4:
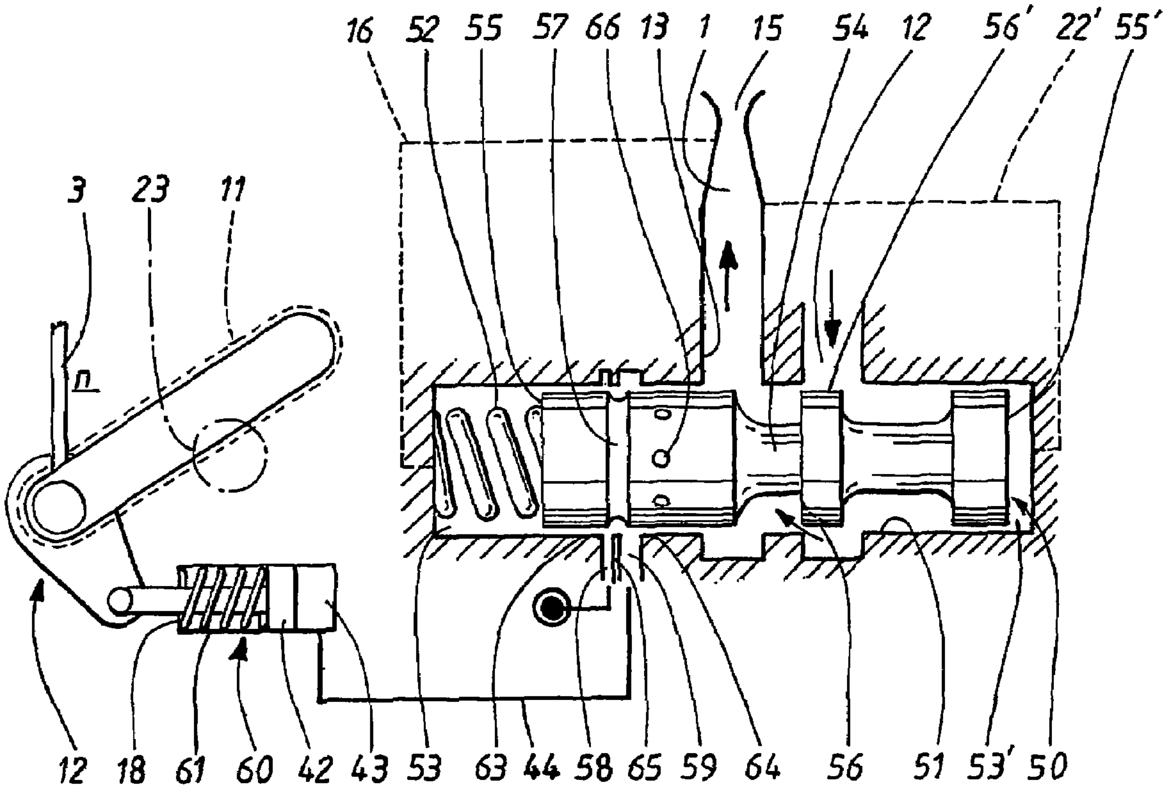
FIG. 4 shows a further-developed part of the hydraulic system according to the invention in regulating position.
Figure 5:
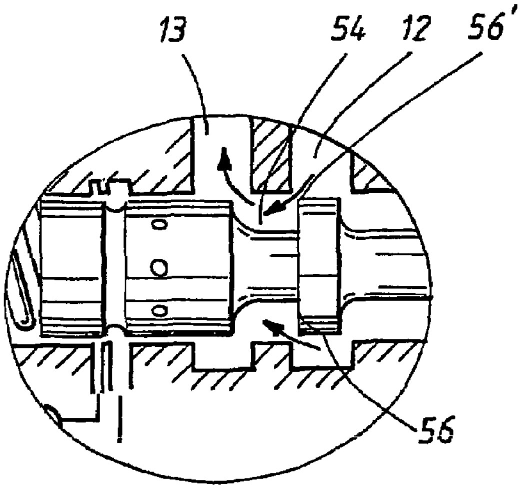
FIG. 5 is a detailed view of the part according to FIG. 4 in acceleration position.
Figure 6:
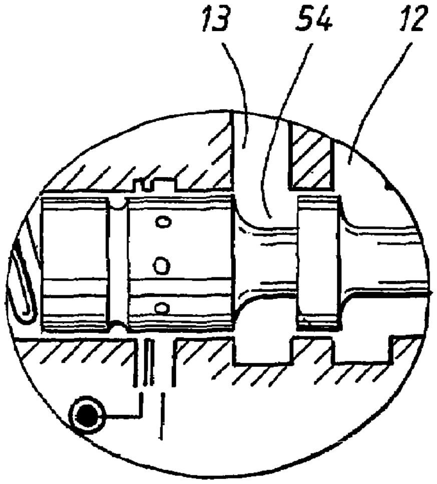
FIG. 6 is a corresponding detailed view in stop position.

In the embodiment according to FIGS. 4-6, the slide is common to both functions, that is to say the flow control to the rotating motor 2 and the guide plate feed. In this example, the slide 50 in the flow control valve 7 is in the form of a piston, which is movable linearly to and fro in a cylindrical bore 51 under the action of on the one hand two counteracting control pressures via the control ducts 16, 22' from the two sides of the narrowing 15 and on the other hand the force from a spring 52. For the sake of simplicity, the start/stop changeover is not shown in FIG. 4. The control pressures are formed in their respective cylinder chambers 53, 53' on the two sides of the piston/the slide 50 and create a pressing force against the respective piston surface 55, 55'. The spring 52, which is suitably adjustable with regard to its spring preloading, provides the necessary additional force in order to determine at which pressure drop across the narrowing 15, and thus which speed of the motor, the slide begins to move. Arranged in the valve housing are a number of ducts for the hydraulic flows to be regulated by means of the valve. The main flow, that is to say the flow which drives the motor 2 and is to be regulated primarily by the flow control valve 7, enters via an inlet 12 and flows out via an outlet 13. Flow regulation is effected by virtue of the slide having in a known manner a main passage in the form of an annular main groove 54 and a throttling edge 56' in the bar 56 of the slide 50. By means of the axial displacement of the grooves under the action of the control pressures and the spring 52, the flow area between the inlet 12 and the outlet 13 is regulated, in which way the main flow is regulated. As indicated by dashed lines, the throttling edge 56' can be designed with creep grooves, the design of which influences the control characteristic.

In the example shown, a further passage in the form of an annular groove 57 is arranged in the same valve slide 50, and two hydraulic flow ducts 58, 59 are arranged in the valve housing. These two ducts and the creep groove 57 form part of the hydraulic fluid circuit for the guide plate feed, which, however, for the sake of simplicity, uses a hydraulic cylinder 60 of single-acting type in the example according to FIGS. 4-6, the return movement of the guide plate feed being ensured by means of a compression spring 6, and one hydraulic fluid line being omitted. The duct 59 therefore communicates via the hydraulic fluid line 44 with the cylinder chamber 43 on one side of the piston 42, while the second duct 58 communicates via a line 62 with a pressure source for hydraulic fluid. Furthermore, the mouths 63, 64 of the ducts 58, 59 in the bore 51 are positioned on the two sides of a partition 65, the position of which Is selected accurately in relation to the position of the throttling groove 57. It may be pointed out that the guide plate feed flow is considerably smaller than the main flow, for example 10% of the main flow, for which reason the dimensions of the two throttling locations are quite different.

By means of the arrangement according to the invention, the guide plate feed during a sawing operation, that is to say the pivoting movement of the saw or to be precise the saw guide plate, will in this way be regulated so that the speed is optimized. The system is sequentially controlled, the guide plate feed having priority. The passages of the slide 50, that is to say the passage 54 for the main flow to the motor 2 and the passage 57 for the feed flow, are to be arranged in such a way that, in the acceleration position according to FIG. 5, that is to say fully open main flow, the feed flow is closed.

A delta pressure is present across the flow control slide over the entire flow area, and, when the pressure has overcome the spring preloading, the slide starts to move (see FIG. 5). It is therefore possible to use a slide movement for regulating the load before the throttling edge 56' starts to close the main flow.

When the motor is stopped, the slide 50 is pushed to the left, the main flow then being stopped. By virtue of the slide being provided with drain holes 66, these come into contact with the guide plate feed cylinder, as a result of which this returns to the original position under the action of the return spring 61.

By means of an additional passage in the form of a groove or the like in the slide, an extra passage with an opening area which varies with the flow/the speed has therefore been obtained. This passage can then be used to throttle the flow to, for example, a guide plate feed cylinder. In this way, the guide plate feed force is regulated in order to keep the motor speed at an operating point slightly lower than the maximum speed set. If the pressure on the cylinder cannot be kept up in spite of the load-regulating area on the slide being fully open (occurs, for example, when the saw leaves the log), the load on the motor drops, which means that the speed will increase, but in this connection the slide moves further so that the slide throttles the motor outlet and the speed is thus limited by means of the constant flow regulation. By adjusting the preloading of the spring, both operating point and maximum flow point are adjusted. In other words, they follow one another, which makes the system easier to set.

Another advantage of integrating load-regulation with the constant flow is of course economy. Considerably fewer components are required, which saves money, weight and space.

The invention is not limited to the illustrative embodiments described above. For example, the saw can be of another type, for example a circular saw, band saw or linear blade saw. The load can be of an entirely different kind, for example drilling equipment or rollers, which are rotated and the speed of which is influenced by another feed movement.

For operating the two functions of flow control and feed movement together in order to control two drive units which interact with one another, it is not necessary for the start/stop function and constant flow regulation to be integrated in one and the same valve component. Constant flow regulation means that the aim is to achieve constant flow but that the actual flow may vary. In principle, the flow can be controlled depending on conditions other than constant flow regulation.

Lumbering means both logging and cutting logs into lengths within the wood and paper industry. Sawing dressed wood, such as lumber, are also possible applications. In principle, all kinds of material processing are conceivable areas.

The invention claimed is:

1. A hydraulic system comprising:

first and second drive units which interact with one another, the first drive unit comprising a hydraulically driven motor that is adapted to drive a varying load, the second drive unit being adapted to perform a working movement which, under the action of hydraulic flow, influences the loading of the motor;

a volume of hydraulic fluid in which a substantially constant pressure is maintained;

a main duct through which a flow of hydraulic fluid is directed from the volume to the motor and the second drive unit, the flow of hydraulic fluid through the main conduit being divided with a first portion of the hydraulic fluid being directed to the motor and a second, different portion of the hydraulic fluid being directed to the second drive unit; and a flow control valve located downstream of the motor and adapted for both starting and stopping the motor and, during operation of the motor, controlling the flow of hydraulic fluid through the motor so as to provide substantially a constant flow through the motor irrespective of load variations on the motor, the flow control valve further coordinating the flow of hydraulic fluid to the second drive unit.

2. The hydraulic system of claim 1 wherein the second drive unit comprises a hydraulic piston cylinder, hydraulic fluid actuating the hydraulic piston cylinder.

3. The hydraulic system of claim 1 wherein the flow control valve has an inlet, an outlet, and at least one duct for directing the flow of hydraulic fluid to the second drive unit.

4. The hydraulic system of claim 3 wherein the flow control valve includes a slide, the slide being movable for controlling the flow of hydraulic fluid to both the motor and the second drive unit.

5. The hydraulic system of claim 4 wherein the slide moves in response to a control pressure.

6. The hydraulic system of claim 2 wherein the hydraulic piston cylinder is of a double-acting type.

7. The hydraulic system of claim 2 wherein the hydraulic piston cylinder is of a single-acting type.

8. The hydraulic system of claim 2 wherein the first and second drive units drive a sawing unit with a saw chain adapted to run in a closed loop around a saw guide plate, which is movable in a feed movement, for lumbering, the motor is adapted to rotate the saw chain, and the piston cylinder is adapted to drive the feed movement of the saw guide plate.

9. The hydraulic system of claim 1 wherein the flow control valve is mechanically linked to another valve and actuation of the flow control valve results in an associated actuation of the other valve, the other valve controlling the flow of hydraulic fluid to the second drive unit.

10. The hydraulic system of claim 1 wherein the flow control valve has a movable slide adapted to control both the flow of hydraulic fluid to the motor and the flow of hydraulic fluid to the second drive unit.

11. The hydraulic system of claim 1 wherein the second drive unit is connected to the main conduit upstream of the motor.

* * * * *